United States Patent [19]
Rippetoe et al.

[11] Patent Number: 5,554,301
[45] Date of Patent: Sep. 10, 1996

[54] WATER CLARIFICATION SYSTEM

[75] Inventors: William W. Rippetoe, Bixby; David N. Shroff, Broken Arrow, both of Okla.

[73] Assignee: Universal Environmental Technologies, Inc., Naples, Fla.

[21] Appl. No.: 436,623

[22] Filed: May 8, 1995

[51] Int. Cl.$^6$ ........................................ C02F 1/40
[52] U.S. Cl. .................. 210/748; 210/802; 210/519; 210/522; 210/540; 210/DIG. 5
[58] Field of Search ..................... 210/748, 801, 210/802, 519, 521, 522, 538, 540, DIG. 5

[56] References Cited

U.S. PATENT DOCUMENTS

| | | | |
|---|---|---|---|
| 3,876,544 | 4/1975 | Fowler | 210/DIG. 5 |
| 3,969,245 | 7/1976 | Ramirez | 210/44 |
| 4,123,365 | 10/1978 | Middelbeek | 210/521 |
| 4,132,651 | 1/1979 | de Jong | 210/522 |
| 4,179,347 | 12/1979 | Krause et al. | 204/149 |
| 4,194,972 | 3/1980 | Weintraub et al. | 210/43 |
| 4,257,895 | 3/1981 | Murdock | 210/521 |
| 4,351,733 | 9/1982 | Salzer et al. | 210/521 |
| 4,417,985 | 11/1983 | Keane | 210/707 |
| 4,469,582 | 9/1984 | Sublette et al. | 210/521 |
| 4,980,070 | 12/1990 | Lieberman | 210/522 |
| 5,468,385 | 11/1995 | Inoue | 210/540 |
| 5,482,629 | 1/1996 | Rippetoe et al. | 210/DIG. 5 |
| 5,485,883 | 1/1996 | Rippetoe et al. | 166/369 |

*Primary Examiner*—Christopher Upton
*Attorney, Agent, or Firm*—Merrill N. Johnson

[57] ABSTRACT

A clarification system for water having entrained in solution or as an emulsion, broad spectrum contaminants. The system comprises a collision chamber having an entry aperture and an ion collider disposed in a central region therein. The ion collider treats the water and the contaminants with a plurality of free electrons. A separation chamber is disposed rearwardly of the collision chamber and is in flow communication with a first overflow weir for receiving the treated water and treated contaminants. An upstanding member in the separation chamber has a plurality of apertures sized to urge passage of the bulk of the treated contaminants through the apertures. A clarifying chamber is disposed rearwardly of the separation chamber and has a plurality of baffle plates obliquely oriented that urge upward flow of the treated water therethrough across the baffle plates. A water collection reservoir is disposed rearwardly of the clarifying chamber and is in flow communication with the clarifying chamber. A contaminant collection tank is disposed rearwardly of the water collection reservoir and is adapted with a contaminant receiving aperture that is in flow communication with a contaminant withdrawal trough in the clarifying chamber.

11 Claims, 8 Drawing Sheets

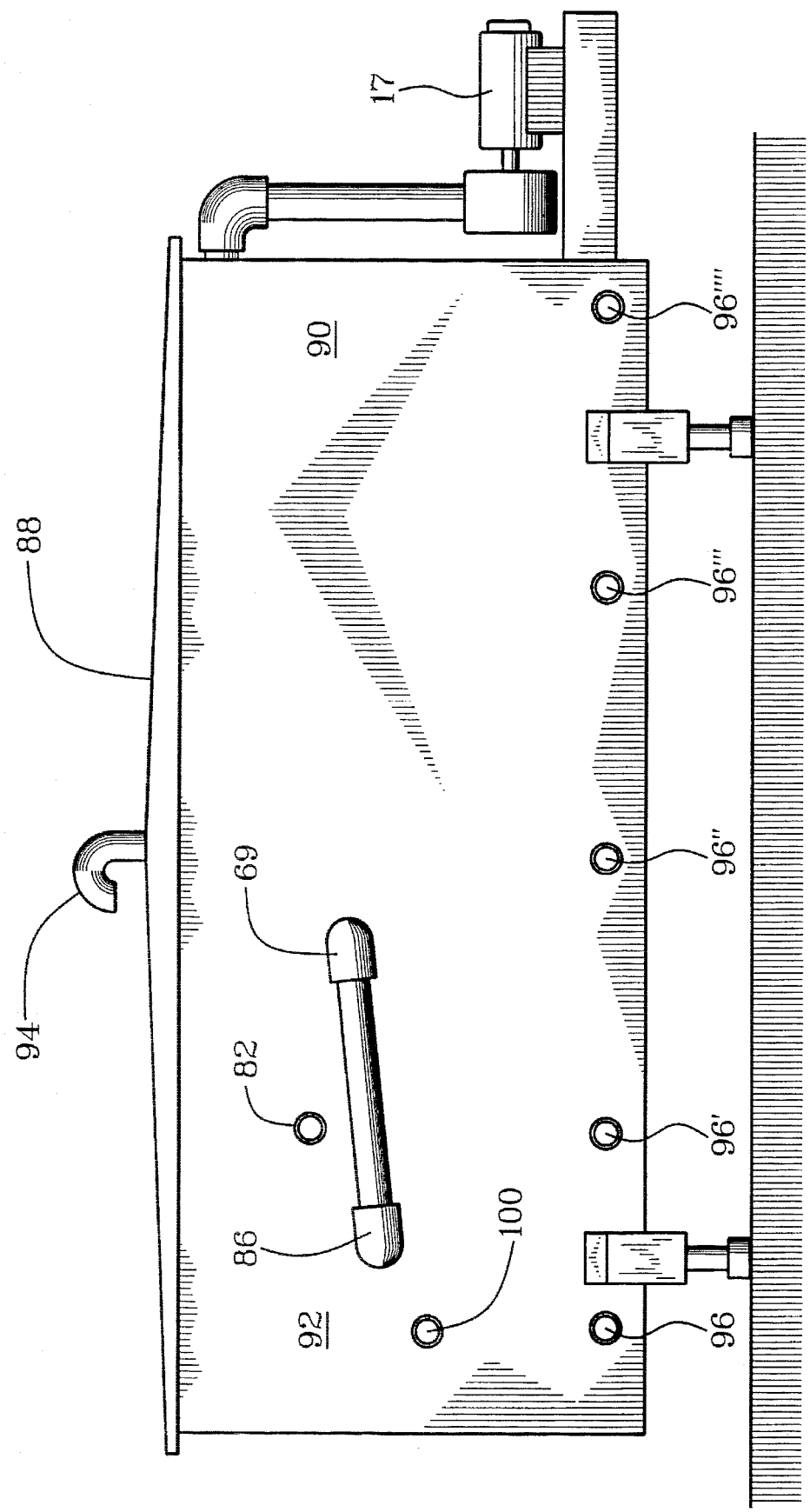

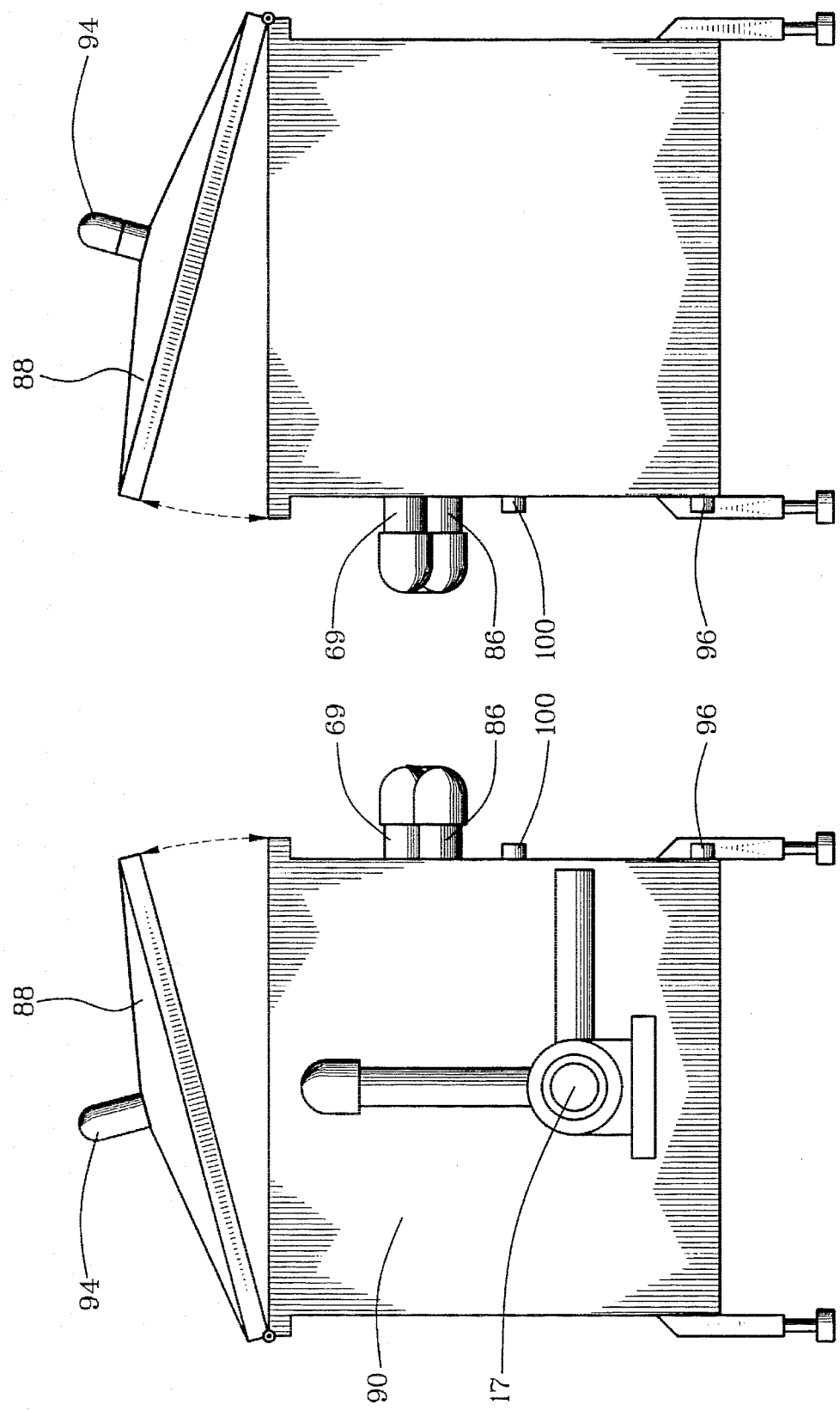

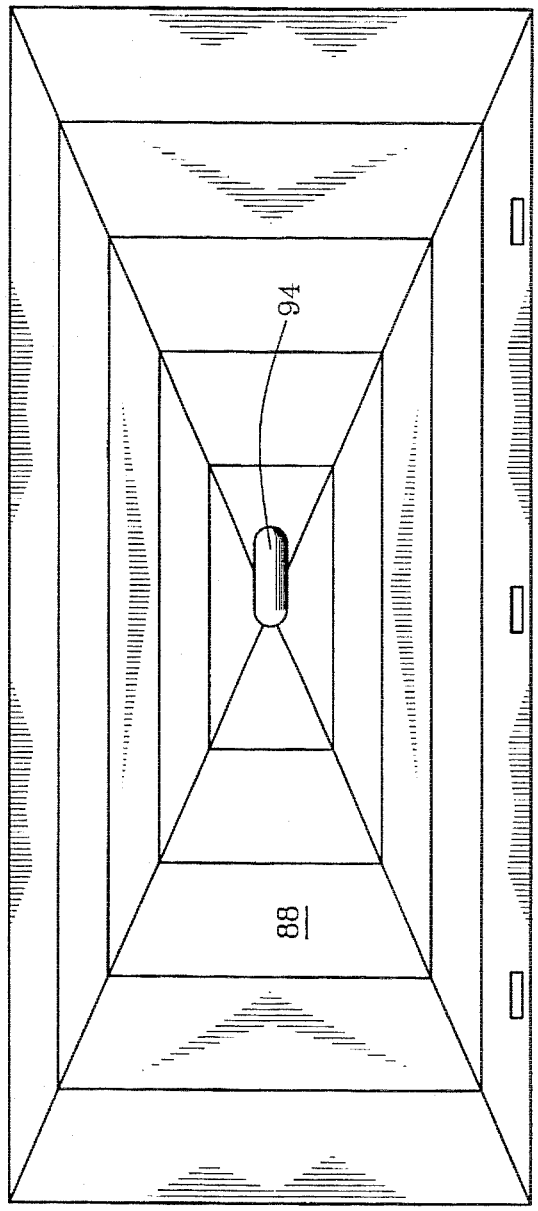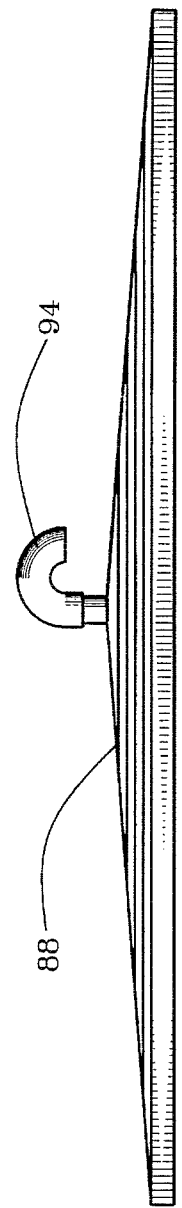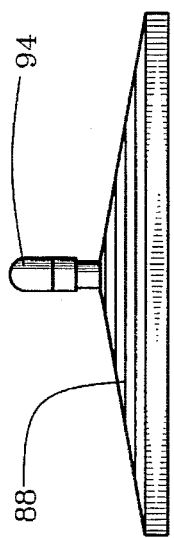
FIG. 8
FIG. 9
FIG. 10

WATER CLARIFICATION SYSTEM

FIELD OF THE INVENTION

The present invention relates to a water clarification system and in particular, to a water clarification system using an Ion Collider TM to achieve a high level of clarification.

BACKGROUND OF THE INVENTION

Throughout the United States steps are being taken to improve clarifiers for separating oil and water. Heretofore, traditional oil/water separators used settling tanks and separation tanks to separate the emulsion consisting primarily of water with oil mixed therein. It is well known that oil and water are immiscible and that oil has a lower specific gravity than water. Accordingly, oil will rise to the top of a settling chamber and can be skimmed off using conventional methods. When the oil is skimmed from the top surface of the water, it is difficult to avoid collecting water with the skimmed oil. A typical conventional water/oil clarifier will skim the oil but the skimmed material will contain about 15% water. Conversely, the separated water usually contains oil at a ratio of about between 15 to 50 parts per million. Needless to say, the concentrations of entrained water in this skimmed oil presents processing problems downstream. The hydrocarbon presence of 15 to 50 parts per million in water renders it dangerous for consumption and usually requires additional treatment to remove the residual hydrocarbons present in the water. Further, oil generally has heavier components (e.g. asphalt) that have a higher specific gravity than water and those heavier components must be allowed to settle. This settling takes quite an additional amount of time and slows the separation process down dramatically.

The present invention achieves its intended purposes, objectives and advantages over the prior art devices through a new, useful and unobvious combination of component elements, which is simple to use, with the utilization of a minimum number of functioning parts, which is simple to use and has a minimum number of moving parts that are constructed of readily available materials. The invention can be manufactured at a reasonable cost because of the ease of assembly and testing.

Therefore, it is an object of the present invention to provide a water clarifier that is extremely efficient in its separation of the oil and water components.

It is a further object of the invention to provide an oil/water clarifier that consumes very low amounts of energy in the purification/clarification process.

It is a still further object of the invention to produce a clarifier that utilizes the principle of ion collision and the exchange of free electrons to accelerate the clarification process.

It is a further object of the invention to clarify other liquids such as antifreeze having entrained hydrocarbons therein.

It is yet a still further object of the invention to provide a water clarification system wherein the separated water has no detectable hydrocarbons (less than ten parts per billion).

Lastly, it is an object of the present invention to provide a water clarification system having an ion collider and a separation chamber and a settling chamber and a collection chamber and a contaminant tank interconnected for continuous processing with external pumping means.

A final object of this invention to be specifically enumerated herein is to provide a water clarification system in accordance with the preceding objects and which will conform to conventional forms of manufacturer be of simple construction and easy to use so as to provide a device that would be economically feasible, long lasting and relatively trouble free in operation.

SUMMARY OF THE INVENTION

The invention is defined by the appended claims with specific embodiments shown in the attached drawings. For the purpose of summarizing the invention, the present invention provides a clarification system for emulsions. The invention has a collision chamber with an entry aperture and an ion collider disposed in a central region therein. As the emulsion passes through the ion collider, it passes over metal alloy surfaces and jetted against the metal alloy inner wall of the outer tube. Passage over the alloy surfaces and jetting the liquid against the alloy surfaces liberates the free metal electrons from the outer shells of the alloy molecules, and an electrical charge is imparted to the water and its contaminant constituents. The emulsion then passes into the lower part of the collision chamber, wherefrom it wells up over a first overflow weir disposed in a rearward region of the collision chamber and into the separation chamber. The primary separation chamber is disposed rearward of the collision chamber and is in continuous flow communication with the collision chamber separated by the first overflow weir for receiving the treated water and the treated contaminants. A wall is disposed in the rear of the separation chamber to control the flow of liquids out of the separation chamber. This wall extends from the top of the chamber down to a level immediately below the hydrostatic level of the treated liquids. This wall then continues at an angle to stop six to eight inches from the chamber floor. In the upper part of this wall there is a plurality of apertures located at the level of the hydrostatic surface of the treated liquids. These holes are dimensioned to allow passage of the film of separated contaminants that float on the surface of the electrically charged treated water from the (primary) separation chamber to a clarifying or secondary separation chamber. A majority of the contaminants will separate to the surface in the primary chamber and the remaining water and trace contaminants are forced by hydrostatic pressure under the lower edge of the separating wall and up through a plurality of baffle plates obliquely disposed for urging the upward flow of the treated water across the rough surface of the baffle plates. Globules of contaminant collect on the surface of these plates and as they agglomerate they increase in buoyancy and float to the surface to be skimmed off by a contaminant withdrawal trough which is located in the rearward portion of the clarification chamber. The withdrawal trough skims the treated contaminants off the surface of the water and achieves separation levels heretofore unachievable with conventional water clarification systems. A water collection reservoir is disposed rearwardly of the clarifying or secondary separation chamber and is in continuous flow communication with the secondary clarification chamber for accumulating the treated water flowing therefrom. The secondary separation chamber is separated from the water collection reservoir by two walls, the first of which extends from the top of the chamber to within six or eight inches of the chamber floor, the second of which is a weir over which the purified water flows into the rearward section of the water collection reservoir. A contaminant collection tank is disposed rearwardly of the water collection reservoir and is fitted with a contaminant receiving aperture that is in continuous flow communication with the contaminant withdrawal aperture. The contaminant collection tank receives the treated contaminants that have been skimmed from the surface of the secondary separation chamber and passed to the separation chamber for storage.

A roof member is disposed horizontally over the above mentioned chambers and reservoirs and tanks. The roof member is in hingeable communication with an outer wall of the collision chamber and an outer wall of the contaminant collection tank. An aperture is disposed in a central portion of the roof member and is in fluid communication with the atmosphere for venting excess gases built up during the clarification process. This insures that the system will operate at atmospheric pressure at all times.

A plurality of apertures are disposed in a lower level on the collision chamber, the clarifying chamber, the water collection reservoir and the contaminant collection tank. These apertures are adapted for withdrawing the heavy oil components and solid contaminants that accumulate over a long period of time during the clarifying process. Finally, a pumping means is provided for transferring the untreated water and broad spectrum contaminants under pressure into the inlet aperture of the collision chamber.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 4 discloses the process flow of the emulsified water with the oil contaminants therein flowing through the respective treatment centers. FIG. 4 also discloses the weirs that direct the flow of the contaminated water therethrough.

FIG. 4A discloses the process stream flow path for the water and the entrained contaminants and the separate process stream flows paths after clarification for the pure water and the contaminants.

FIG. 5 is a left side view of the invention disclosing the contaminant withdrawal trough and the contaminant receiver aperture and a section of piping therebetween;

FIG. 6 is a left hand end elevation view disclosing the pumping means mounted on a side section thereof;

FIG. 7 is a right hand end elevation view of the invention disclosing the roof member being in a pivotably partially installed status;

FIG. 8 is a top plan view of the invention disclosing the roof member having an aperture disposed in a central region thereof for maintaining the system at atmospheric pressure at all times;

FIG. 9 is a front plan elevation of the roof member disclosing the roof member being in a hingeable relationship with the rear section;

FIG. 10 is a side elevation view of the roof member;

DETAILED DESCRIPTION OF THE PREFERRED EMBODIMENT

Figure 1:
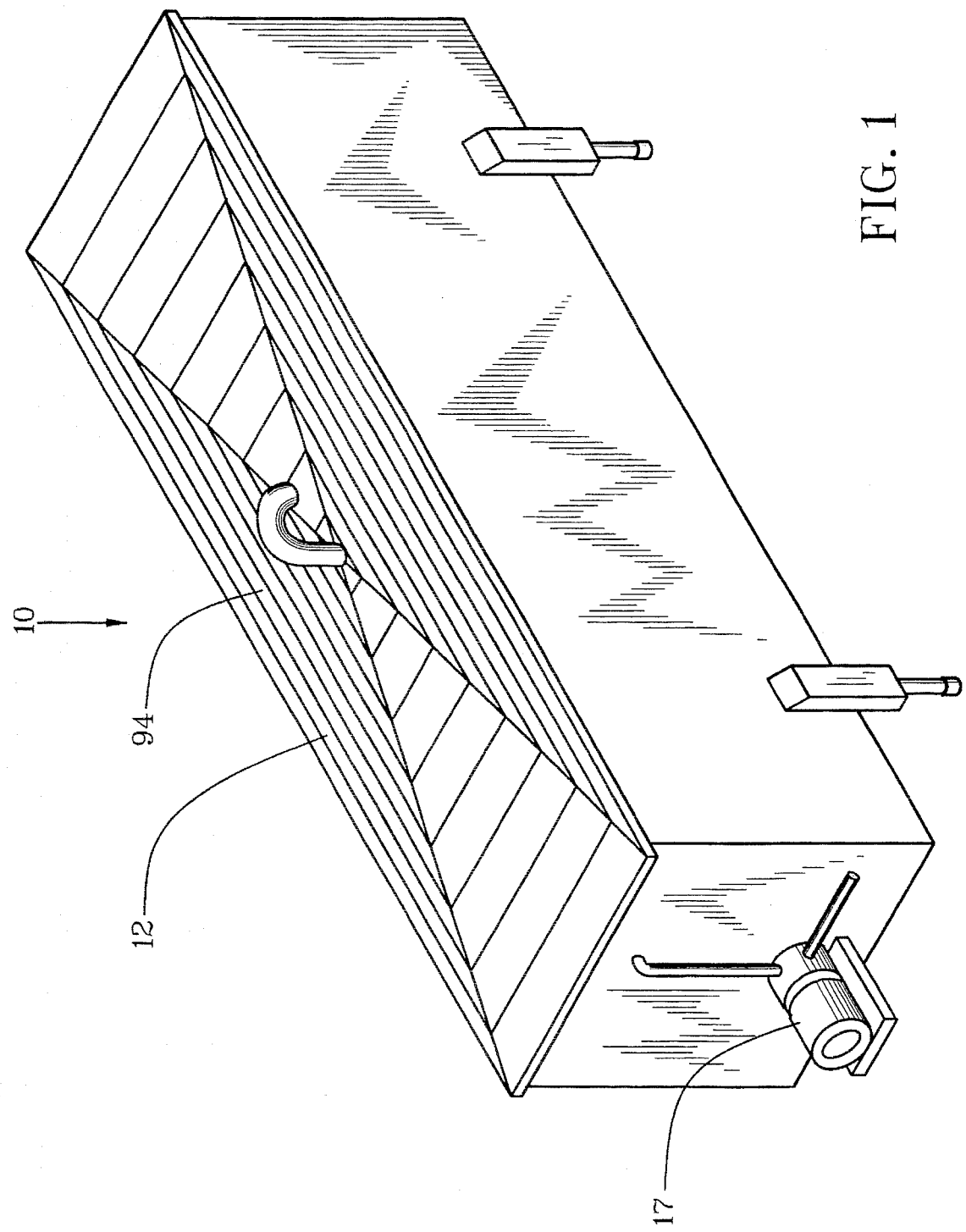
FIG. 1 is a perspective illustration of the invention in its fully assembled form.
Figure 2:
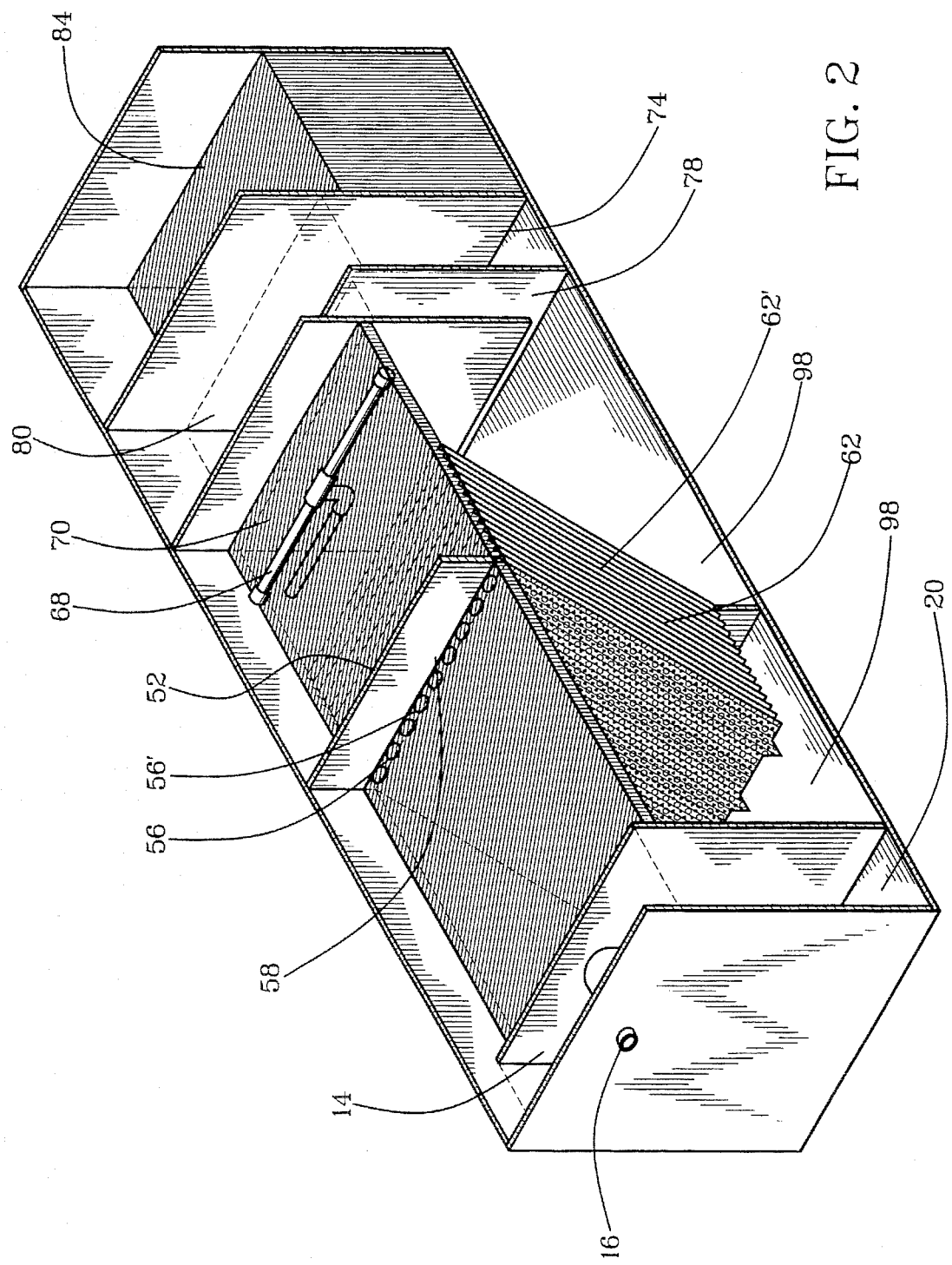
FIG. 2 is a perspective illustration of the invention with the roof member and a side panel removed disclosing the relationship of the chambers and reservoirs and the tanks.
Figure 3:
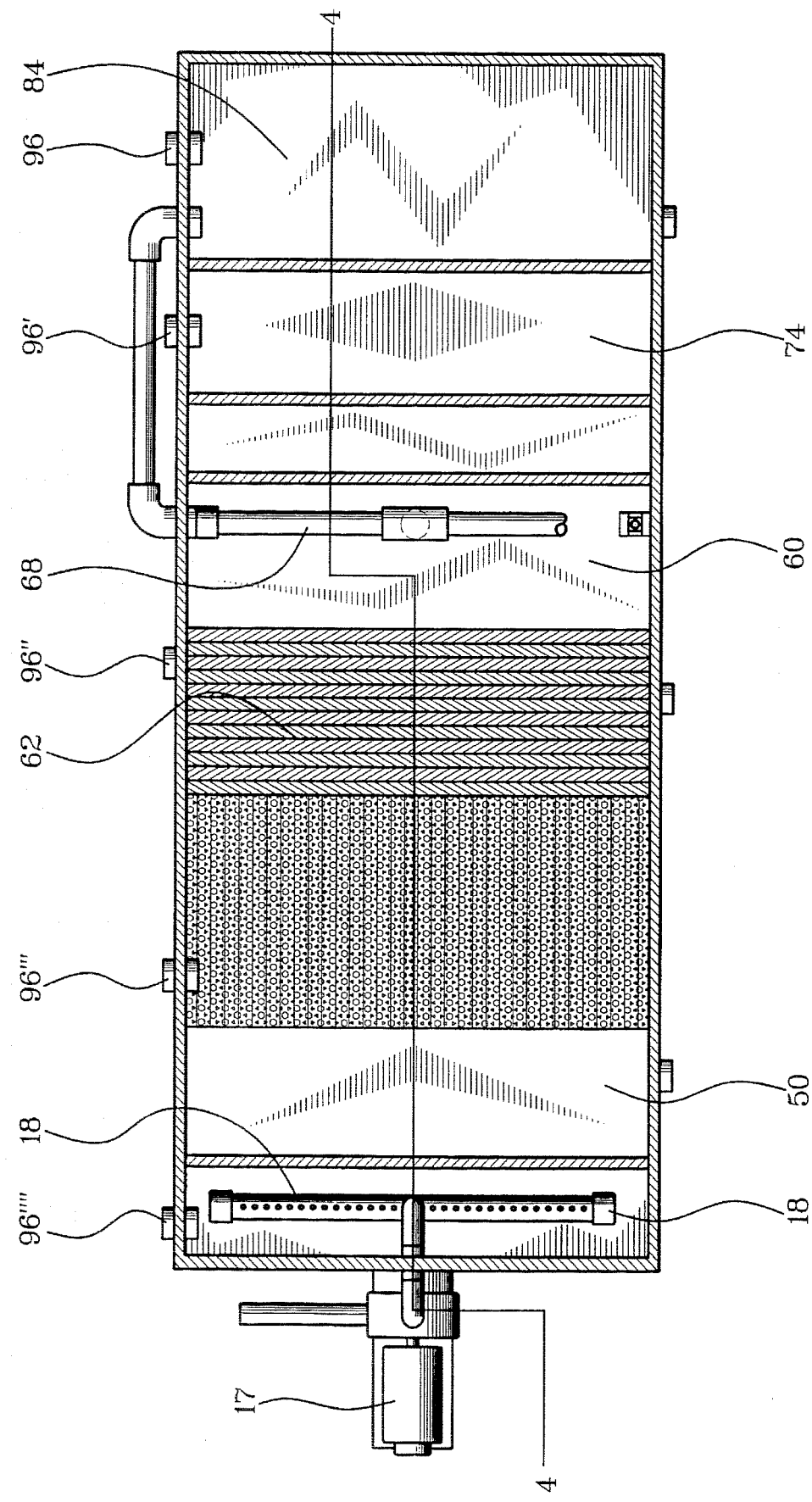
FIG. 3 is a top plan view of the invention with the roof member removed disclosing the collision chamber, the clarifying chamber, the separation chamber and the pure water reservoir and the contaminant storage tank.

The invention combines three well known scientific principles in a new and effective manner.

First, metals are less electronegative than liquids. Metals in general have a lower ionization level and electron affinity than liquids. Copper and nickel are among the least electronegative of the metals and readily give up the electrons in their outer orbitals to liquids.

Prior to the addition of the electrical charge, the liquids and colloids have a chemical and electrical affinity which caused an emulsion to be formed. The polarity caused by the addition of a negative electrical charge to the emulsified liquid and particular molecules causes the constituents to repel one another and separation occurs.

Second, the propensity for a metal to give up electrons is directly related to the energy levels of the molecules. These energy levels may be increased by increasing temperature or pressure. In the ion collider local pressures are increased by bombarding an alloy plate with a jet of liquids thereby increasing the natural propensity of the alloy to surrender free electrons to the more electronegative liquids.

Third, nickel is a powerful activator of copper acting as a catalyst enhancing the propensity of both copper and nickel to surrender electrons to a stream of liquid which is by nature, electronegative.

The ion collider utilizes the foregoing scientific principles into a novel and remarkably effective apparatus for breaking emulsions and purifying the constituents. For example, water and oil water are separated so effectively that the recovered water is not contaminated with oil and recovered oil is not contaminated by water.

Referring generally to FIGS. 1 through 12, the invention 10 comprises a clarification system 12 for water having entrained in solution or as an emulsion, broad spectrum contaminants. The water and broad spectrum contaminants enter a collision chamber 14 through an entry aperture 16. Pumping means 17 transfer the untreated water and broad spectrum contaminants under pressure into the inlet aperture 16 of the collision chamber 14 to start the process. The overall process flow can be best understood in FIG. 4A. An ion collider 18 is disposed in a central region 20 of the collision chamber 14 and is in flow communication with the aperture 16. The ion collider 18 treats the water and the entrained broad spectrum contaminants with a plurality of free electrons. The ion collider has a plurality of spaced apart concentric elongated cylindrical metal pipes 22, 22' in a concentric relationship that form an annular zone 23. The pipes 22, 22' are oriented in a circumadjacent annular relationship and are adapted for surrendering the free electrons to the water and to the contaminants therein. Preferably, the inner pipe 22 can be made from a copper/nickel alloy. The outer pipe 22' may be made from any copper/nickel alloy, or from any ferrous metal with an outer surface 24 of the inner pipe 22 and an inner surface 26 of the outer pipe 22' is coated with an alloy of copper and nickel, by flame coating or the like, preferably the flame coated ferrous pipe.

Figure 11:
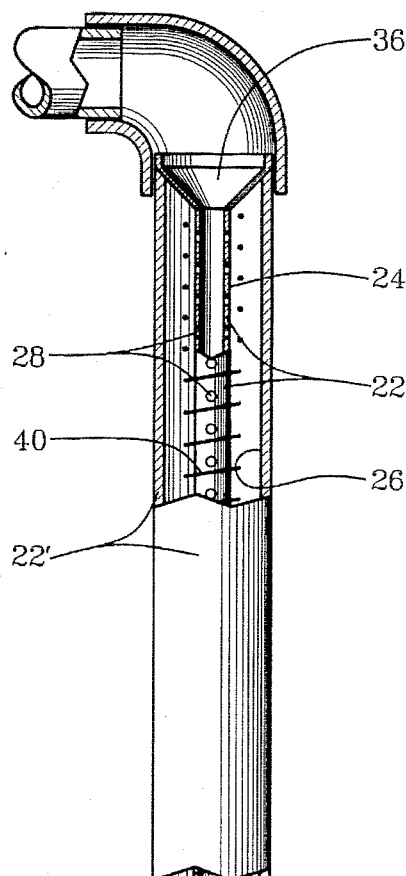
FIG. 11 is a magnified view of the ion collider as disclosed in FIG. 4.

The inner pipe 22 contains a plurality of spaced apart radially bored apertures 28, 28' and has an exit end 30 that is in closed communication with a cap 32. The cap 32 has an aperture 34 disposed centrally therein. The diameter of the aperture 34 in the cap 32 is slightly larger than the diameter of the plurality of apertures 28, 28'. The inner pipe 22 has an entry end 36 joined to the outer pipe 22' as best seen in FIG. 11. The inner surface 26 of the outer pipe 22' can be spaced about between one to two inches from the outer surface 24 of the inner pipe 22, but preferably about one and one-half inches. Both the inner pipe 22 and the outer pipe 22' can be made from a copper/nickel alloy in which nickel comprises about between one-half to one and one-half percent of the total volume of the pipe and the copper comprises at least about between seventy to ninety percent by volume of the pipe. Preferably the nickel should be at least one percent of the total volume of the pipe and the copper should be at least eighty percent of the total volume.

Figure 11A:
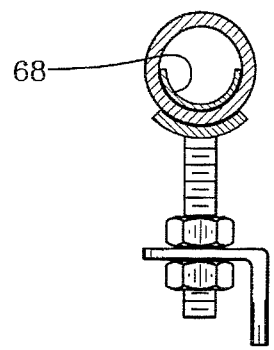
FIG. 11A is a transverse sectional view of the ion collider as disclosed in FIG. 4 showing the "T" shaped configuration ion collider.
Figure 11B:
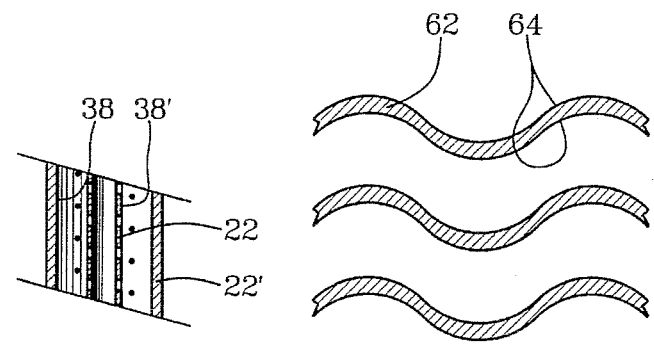
FIG. 11B is a magnified view of the ion collider as disclosed in FIG. 4 showing the course inner surface of the outer pipe and the outer surface of the inner pipe.
Figure 12:
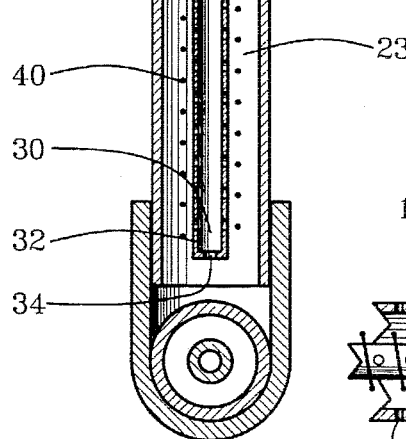
FIG. 12 is a magnified view of the contaminant withdrawal trough and support bracket as disclosed in FIG. 4.
Figure 13:
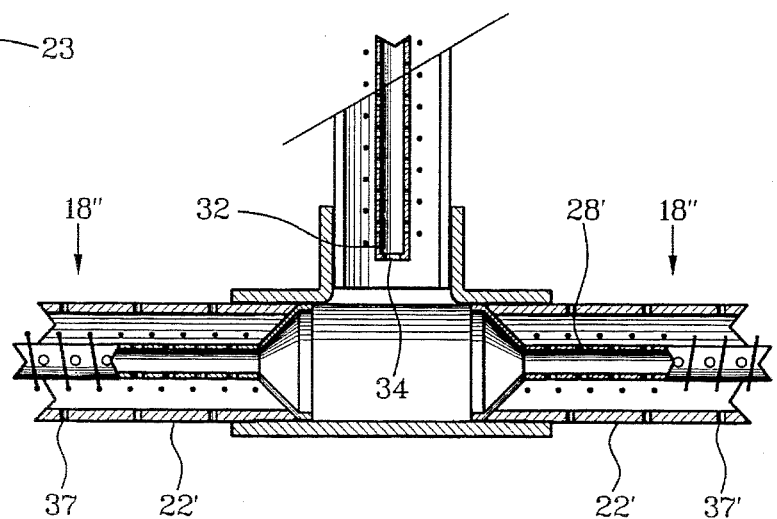
FIG. 13 is a sectional view of the corrugated surface of the baffle plates.

The ion collider 18 can be configured in any shape, but preferably in an inverted "T" shape as best seen in FIG. 11A. Based on the desired treatment rate expressed in Gallons per Minute (GPM), the inverted "T" will hold one vertically disposed ion 18 collider and up to two horizontally disposed ion colliders 18', 18" preferably two ion colliders as best seen in FIG. 11A. The outer pipes 22 that are horizontally disposed have a second plurality of radially bored apertures 37, 37' that discharge the treated water and contaminants downstream and decelerate the flow from turbulent flow to laminar flow. The ion collider works best with turbulent flow whereas the balance of the clarification system 12 works best with laminar flow.

The use of black iron pipe with the copper/nickel alloy being flame coated on the outer surface of the inner pipe and the inner surface of the outer pipe produces an economic advantage over copper/nickel alloy pipes. Also, the flame coating produces a rough and irregular surface 38 which presents more surface area of the copper/nickel alloy to the turbulent mixing action of the liquid as it is pumped through the annular zone 23. The additional surface area causes the surrender of additional electrons from the surface of the copper/nickel alloy coated pipes 22, 22' to the liquid and the immiscible particles passing therethrough.

A helix of copper or copper/nickel alloy wire 40 is loosely wrapped between the outer surface 24 of the inner pipe 22 and the inner surface 26 of the outer pipe 22' to increase the turbulence in the annular zone 23 therein. Preferably, the helical wire will have a diameter of about between 1/32 to 1/8 of an inch, preferably 1/16 of an inch. The wire 40 is wound with a frequency of not less than a 1/4 of an inch pitch and not more than one inch apart measured longitudinally along the axis of the inner pipe 22.

The collision chamber 14 also has a upwardly depending first overflow weir 48 disposed in a rearward region 49 that directs the flow of treated water and treated broad spectrum contaminants upwardly and out of the collision chamber 14 after passage through the ion collider 18. A separation chamber 50 is disposed rearwardly of the collision chamber 14 and is in flow communication with the first overflow weir 48. The separation chamber 50 receives the treated water and treated contaminants and directs the treated water and the treated contaminants to an elongated upstanding member 52 disposed in a rearward section 54 of the separation chamber 50. A plurality of second apertures 56, 56' sized to urge passage of the bulk of the treated contaminants are oriented in an upper section 58 of the elongated upstanding member 52.

A clarifying chamber 60 is disposed rearwardly of the separation chamber 50 and has a plurality of baffle plates 62, 62' obliquely disposed that urge upward flow of the treated water thereof across the baffle plates 62, 62' and clarify the remaining treated contaminants from the treated water. Each baffle plate 62 further includes a corrugated irregular surface 64 that enlarges the contact surface area between the contaminants and the baffle plates 62, 62'. Increasing the contact surface area increases the clarification of the treated water from the treated contaminants. The clarifying chamber 60 also includes a contaminant withdrawal trough 68 oriented in a rearward portion 70 for skimming the remaining treated contaminants off the surface of the treated water. The trough 68 discharges the skimmed contaminants through piping to a discharge aperture 69. The clarifying chamber 60 further includes an elongated baffle member 72 downwardly depending in the rearward portion 70 that urges the pure treated water to flow under the elongated baffle member 72.

A water collection reservoir 74 is disposed rearwardly of the clarifying chamber 60 and is in flow communication with the clarifying chamber 74. The water collection reservoir 74 accumulates the treated water flowing therein. A second overflow weir 76 is disposed in a forward area 78 and directs the treated water to flow into a rear portion 80 of the water collection reservoir 74. The water collection reservoir 74 further includes a water withdrawal aperture 82 disposed in the rear portion 80 that allows removal of the pure water from the water collection reservoir 74.

A contaminant collection tank 84 is disposed rearwardly of the water collection reservoir 74 and is adapted with a contaminant receiving aperture 86 that is in flow communication with the contaminant withdrawal trough 68 and aperture 69. The contaminant receiving aperture 84 receives the treated contaminants withdrawn from the clarifying chamber 60.

A roof member 88 is horizontally disposed and is in hingeable, removable communication with an outer wall 90 of the collision chamber 14 and an outer wall 92 of the contaminant collection tank 84. The roof member 88 further includes a fourth aperture 94 in fluid communication with the atmosphere for venting any excess gases built up during the clarifying process. In this manner, the aperture 94 maintains the system 12 at atmospheric pressure at all times.

A plurality of fifth apertures 96, 96' are disposed in each lower level 98, 98' of the collision chamber 14, the separation chamber 60, the clarifying chamber 60, the water collection reservoir 74, and the contaminant collection tank 84. Each aperture 98 is adapted to withdraw solid contaminants that accumulate during the clarifying process.

Figure 4:
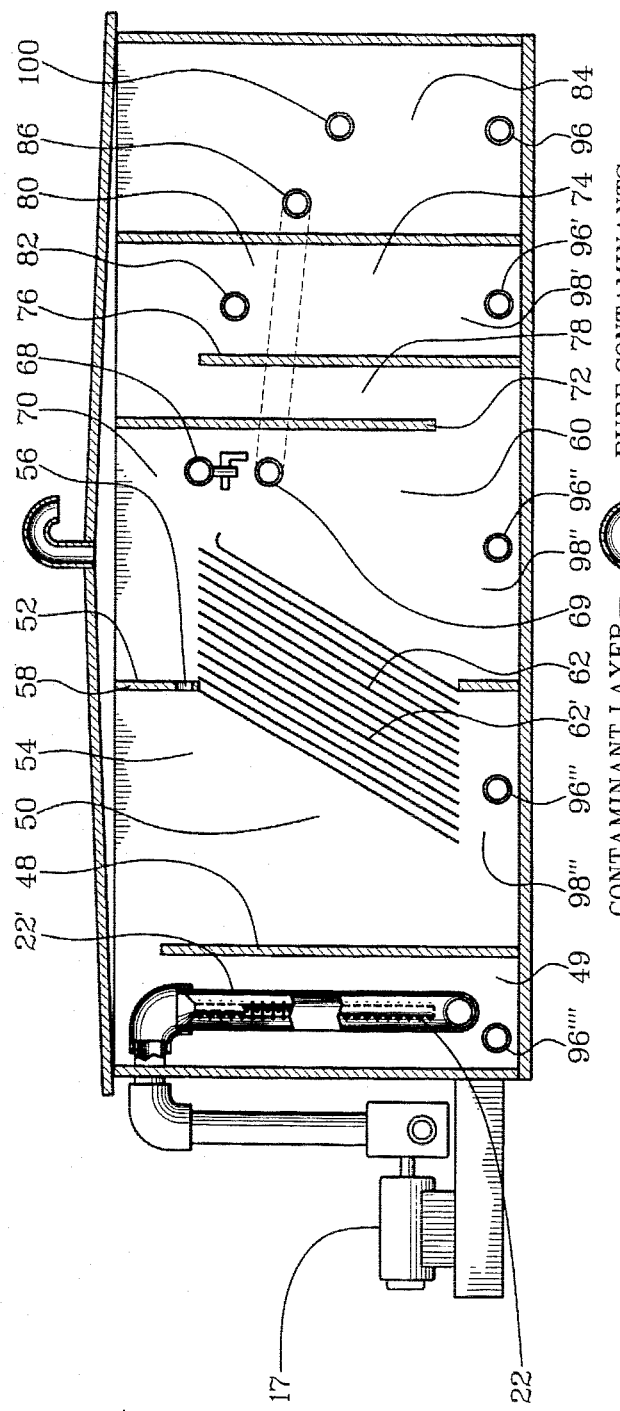
FIG. 4 is a longitudinal cross section taken along viewing lines 4—4 in FIG. 3.
Figure 4A:
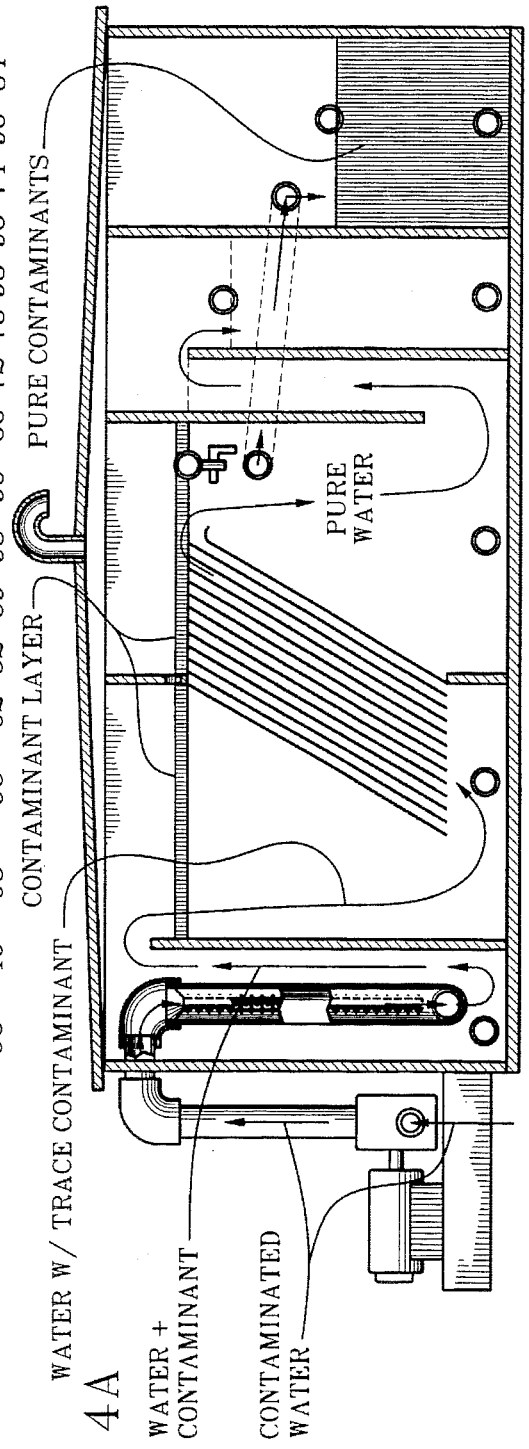
FIG. 4A is a longitudinal cross section taken along viewing lines 4—4 in FIG. 3.

As best seen in FIG. 4A, in use and operation the system 12 clarifies the water having entrained broad spectrum contaminants by first pumping the untreated water and broad spectrum contaminants into the inlet aperture 16 of the collision chamber 14. The ion collider 18 in the collision chamber 14 then treats the water and the broad spectrum contaminants passing through the collision chamber 18 with a plurality of free electrons. The treated water and treated contaminants flow into the separation chamber 50 where the bulk of the treated contaminants are separated from the treated water through the plurality of apertures 56, 56'. After separation, the treated water and the remaining treated contaminants flow from the separation chamber 50 into the clarifying chamber 60 whereupon the remaining treated contaminants are removed from the treated water at the trough 68 by skimming the treated contaminants off the surface of the treated water. The now pure treated water is accumulated by flowing the pure treated water under the elongated baffle member 72 into the water collection reservoir 74. The separated treated contaminants are withdrawn from the clarifying chamber 60 into the contaminant collection tank 84 from the withdrawal trough 68 and discharge aperture 69. The oil removed is saved therein and discharged through an outlet 100 for future processing and reclamation.

Although this invention has been described in its preferred form with a certain degree of particularity, it is understood that the present disclosure of the preferred form has been made only by way of example and that numerous changes in the structures and the combination and arrangement of parts may be resorted to without departing from the spirit and scope of the invention as claimed.

We claim:

1. A clarification system for water having entrained in solution or as an emulsion, broad spectrum contaminants comprising:

a collision chamber having an entry aperture and an ion collider disposed in a central region therein, the ion collider for treating the water and the entrained broad spectrum contaminants with a plurality of free electrons and the water and the broad spectrum contaminants then passing out of the collision chamber, the collision chamber further having a first overflow weir disposed in a rearward region for directing the flow of treated water and treated broad spectrum contaminants out of the collision chamber after passage through the ion collider;

a separation chamber disposed rearwardly of the collision chamber and being in flow communication with the first overflow weir for receiving the treated water and treated contaminants, the separation chamber further including an elongated upstanding member disposed in a rearward section of the separation chamber and having a plurality of apertures sized to urge passage of the bulk of the treated contaminants through the apertures;

a clarifying chamber disposed rearwardly of the separation chamber and having a plurality of baffle plates obliquely oriented for urging upward flow of the treated water therethrough across the baffle plates and clarifying the remaining treated contaminants from the treated water, the clarifying chamber further including a contaminant withdrawal aperture oriented in a rearward portion for skimming the treated contaminants off the surface of the treated water;

a water collection reservoir disposed rearwardly of the clarifying chamber and being in flow communication with the clarifying chamber for accumulating the treated water flowing therein, the water collection reservoir further including a second overflow weir disposed in a forward area for urging the treated water to flow into a rear area of the water collection reservoir; and a contaminant collection tank disposed rearwardly of the water collection reservoir and being adapted with a contaminant receiving aperture in flow communication with the contaminant withdrawal aperture for receiving the treated contaminants withdrawn from the separation chamber.

2. A water clarification system as recited in claim 1 wherein each baffle plate further includes a corrugated irregular surface for enlarging the contact area between the contaminants and the baffle plates for increasing the clarification of the treated water from the treated contaminants.

3. A water clarification system as recited in claim 1 wherein the ion collider further includes a plurality of flow tubes vertically disposed in an inner section, the flow tubes being oriented in a circumadjacent annular relationship for surrendering the electrons to the water and to the contaminants therein.

4. A water clarification system as recited in claim 1 wherein the clarifying chamber further includes an elongated baffle member downwardly disposed in the rearward portion for urging the treated water to flow under the elongated baffle member.

5. A water clarification system as recited in claim 1 wherein the water collection reservoir further includes a water withdrawal aperture disposed in a rear portion of the water collection reservoir for urging removal of the pure water from the water collection reservoir.

6. A clarification system as set forth in claim 1 and further including a roof member being horizontally disposed and in hingeable, removable communication with an outer wall of the collision chamber and the contaminant collection tank, the roof member further including an aperture in fluid communication with the atmosphere for venting any excess gases built up during the clarifying process to the atmosphere and for maintaining the system at atmospheric pressure at all times.

7. A clarification system as set forth in claim 1 and further including a plurality of apertures disposed in a lower level of the collision chamber, the clarifying chamber, the water collection reservoir, and the contaminant collection tank, the apertures for withdrawing solid contaminants that accumulate during the clarifying process.

8. A clarification system as set forth in claim 1 and further including pumping means for transferring the untreated water and broad spectrum contaminants under pressure into the inlet aperture of the collision chamber.

9. A method for clarifying water having entrained broad spectrum contaminants comprising the steps of:

pumping the untreated water and broad spectrum contaminants into an inlet aperture of an Ion Collider;

treating the water and the broad spectrum contaminants passing through the collision chamber with a plurality of electrons;

receiving the treated water and treated contaminants in a separation chamber;

separating the treated contaminants from the treated water through a plurality of apertures;

flowing the treated water and treated contaminants from the separation chamber into a clarifying chamber;

clarifying the remaining treated contaminants from the treated water;

decanting the treated contaminants from the treated water by skimming the treated contaminants off the surface of the treated water;

accumulating the flowing treated water in a water collection reservoir; and receiving the treated contaminants withdrawn from the separation chamber in a contaminant collection tank.

10. A method for clarifying water as recited in claim 9 and after pumping further including the steps of:

flowing the liquid under pressure into an elongated cylindrical collision chamber; and discharging the liquid out of the elongated cylindrical collision chamber in the form of a plurality of jets of liquid directed against the walls of a larger axially aligned annular chamber the walls of which are made of a copper-nickel alloy to induce the copper-nickel alloy to give up electrons.

11. A clarification system for water having entrained broad spectrum contaminants comprising a collision chamber having an entry aperture and an ion collider disposed in a central region therein, the ion collider providing a plurality of free electrons for treating the water and the entrained broad spectrum contaminants with the free electrons as the water and the broad spectrum contaminants passing through the collision chamber, a separation chamber disposed rearwardly of the collision chamber and being in flow communication with the collision chamber for receiving the treated water and treated contaminants, the separation chamber further including a plurality of apertures sized to urge passage of the bulk of the treated contaminants through the apertures, a clarifying chamber disposed rearwardly of the separation chamber and having a plurality of baffle plates obliquely disposed for urging upward flow of the treated water therethrough across the baffle plates and clarifying the remaining treated contaminants from the treated waters, a water collection reservoir disposed rearwardly of the clarifying chamber and being in flow communication with the clarifying chamber for accumulating the treated water flowing therein, a contaminant collection tank disposed rearwardly of the water collection reservoir and being adapted with a contaminant receiving aperture in flow communication with the clarifying chamber for receiving the treated contaminants withdrawn from the clarifying chamber, a roof member being horizontally disposed and in hingeable, removable communication with an outer wall of the collision chamber and the contaminant collection tank, the roof member further including an aperture in fluid communication with the atmosphere for venting any excess gases built up during the clarifying process, a plurality of apertures disposed in a lower level of the collision chamber, the clarifying chamber, the water collection reservoir, and the contaminant collection tank for withdrawing solid contaminants that accumulate during the clarifying process, and pumping means for transferring the untreated water and broad spectrum contaminants into the inlet aperture of the collision chamber.

* * * * *